United States Patent [19]
Shrock

[11] Patent Number: 5,730,412
[45] Date of Patent: Mar. 24, 1998

[54] LOCKING ADJUSTABLE SEAT

[75] Inventor: Fred J. Shrock, Elkhart, Ind.

[73] Assignee: Shrock Manufacturing, Inc., Elkhart, Id.

[21] Appl. No.: 599,088

[22] Filed: Feb. 9, 1996

[51] Int. Cl.⁶ .................................................. F16M 13/00
[52] U.S. Cl. ........................................... 248/429; 248/903
[58] Field of Search .................................... 248/429, 393, 248/394, 430, 903

[56] References Cited

U.S. PATENT DOCUMENTS

| | | | |
|---|---|---|---|
| 1,600,794 | 6/1926 | Brown | 248/903 |
| 5,014,958 | 5/1991 | Harney | 248/429 |
| 5,224,749 | 7/1993 | Gauger et al. | 248/429 |
| 5,348,261 | 9/1994 | Nini | 248/429 |
| 5,349,878 | 9/1994 | White et al. | 248/429 |
| 5,564,315 | 10/1996 | Schuler et al. | 248/429 |
| 5,568,908 | 10/1996 | Kisiel | 248/429 |

Primary Examiner—Ramon O. Ramirez
Attorney, Agent, or Firm—Baker & Daniels

[57] ABSTRACT

A locking adjustable seat assembly for use in motor vehicles such as van conversions, motorhomes, and other recreational vehicles that allows the seat to be adjusted in the fore and aft direction and then locked into place. The seat assembly disclosed herein conforms to Federal Motor Vehicle Safety Standards and is lightweight yet stronger, stiffer, and much more able to withstand a crash than traditional designs. The present invention utilizes a pair of mounting brackets formed from a pair of spaced apart sidewalls that include slots for supporting the sliding seat frame. The assembly includes a locking mechanism that engages a locking pin disposed between the side wall brackets, and adjusts to and automatically locks in a number of predetermined positions.

13 Claims, 13 Drawing Sheets

LOCKING ADJUSTABLE SEAT

This invention relates to a locking adjustable seat assembly for use in a conversion van, motor home, or other vehicle.

BACKGROUND OF THE INVENTION

In a crash, if a seat is not adequately secured the passengers will be thrown around inside the vehicle or, even worse, the passengers could be thrown completely out of the vehicle. In both circumstances the passengers face a significant risk of serious injury. Thus, in order to protect the passengers in a crash, the seat assembly must be adequately secured to the vehicle so that the seat mounts can absorb the full impact of the crash instead of tearing loose from the floor of the vehicle. Accordingly, the seats used in motor vehicles are subject to certain performance and safety criteria as dictated by the Federal Motor Vehicle Safety Standards.

Compounding the problem is the fact that on most modern vehicles the seats are mounted on a slide or track assembly that slides relative to a floor mounted base and then locks on the base in a desired position, which enables the seat to accommodate short and tall occupants. Thus, simply strengthening the connection between the seat base and the floor of the vehicle does not solve the whole problem. The slide and lock assembly must also be able to withstand the impact of a crash, or the seat will simply slide off of the floor mounted base, again subjecting the passengers to possible serious injury. Therefore, not only must the seat base be adequately secured to the floor of the vehicle, but the slide and lock assembly must also be strong enough to withstand the forces generated in a crash.

In a standard passenger vehicle, the slide and lock assembly need only be strong enough to account for the weight of the passenger and the weight of the seat itself, and such standard slide and lock assemblies are well known in the art and satisfy the present safety criteria. However, in other applications, such as conversion vans, motor homes, and other recreational vehicles, the standard slide and lock assembly is not sufficient for a number of reasons. For example, in a recreational vehicle, the normal bench seat, which is designed to carry up to three passengers, includes a reclining seat back and possibly an extensible foot rest so that the bench seat may be used as a bed. Such seat-bed assemblies include a complex linkage structure for simultaneously reclining the seat back and extending the foot rest to the desired position. On the more luxurious recreational vehicles the seat-bed assemblies are motor driven. Accordingly, seats used in recreational vehicles including conversion vans are commonly much heavier than standard automotive seats. Examples of such seats can be found in U.S. Pat. No. 4,321,716, which discloses a manually operated seat-bed assembly, and U.S. Pat. No. 4,563,784, which discloses a power actuated seat-bed assembly. As on typical passenger vehicles, the entire Seat is designed to slide back and forth on its base and lock in position in order to accommodate short and tall occupants, and also to move the seats away from a wall to give the seats enough room to recline.

A standard slide and lock mechanism from a typical passenger vehicle is simply not strong enough to handle the additional weight of the reclining back, the extensible foot rest, the linkage mechanism, and the motor-drive unit, combined with the weight of three passengers. Furthermore, simply beefing up the traditional design adds yet more weight, which is counterproductive because the added weight in turn generates more force in an impact. Also, the traditional design is less stiff in the lateral direction, which seriously affects the smoothness of operation desired in these applications. Accordingly, there exists a need for a slide and lock assembly that minimizes weight but that is strong enough to withstand the impact forces generated in a crash, accounting for the weight of three passengers as well as the weight of the seat-bed assembly.

SUMMARY OF THE INVENTION

The present invention provides a sliding and locking adjustable seat assembly that is lightweight yet still suitable for use with the heavier seat-bed mechanisms typically found in van conversions, motor homes, and other recreational vehicles. The sliding seat frame is mounted on a pair of elongated mounting brackets comprised of a pair of spaced side walls that provide an extremely strong, stiff, and lightweight track to support the sliding seat frame, with each bracket including a locking pin that is capable of withstanding the forces generated by an impact. Each of the bracket sidewalls includes a pair of elongated slots, and a portion of the seat frame extends into the gap between the sidewalls and is slidably supported by the slots, which enables the seat frame to easily slide fore and aft when the seat is being adjusted. The assembly includes a locking mechanism that fixes the fore/aft position of the seat by engaging the locking pin discussed above, and the locking mechanism includes a number of notches so that the seat frame can be locked in a number of positions relative to the vehicle floor, using a linkage system that enables the user to adjust the seat from the front or from the rear. The locking mechanism is also spring loaded, so that the lock automatically engages when the seat reaches the proper position.

Accordingly, it is an object of this invention to provide an improved locking adjustable seat assembly that is strong yet lightweight and that can withstand the tremendous fore and aft impact forces generated in a crash.

It is another object of this invention to provide a locking adjustable seat assembly that is strong and stiff in the lateral direction so as to reduce side sway.

A further object of this invention is to provide a locking adjustable seat assembly that automatically locks in any of the desired position and that can be operated from the from or the rear.

Other objects of the invention will become readily apparent to those skilled in the art upon a reading of the following description.

3

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to best enable others skilled in the art to follow its teachings.

Figure 1:
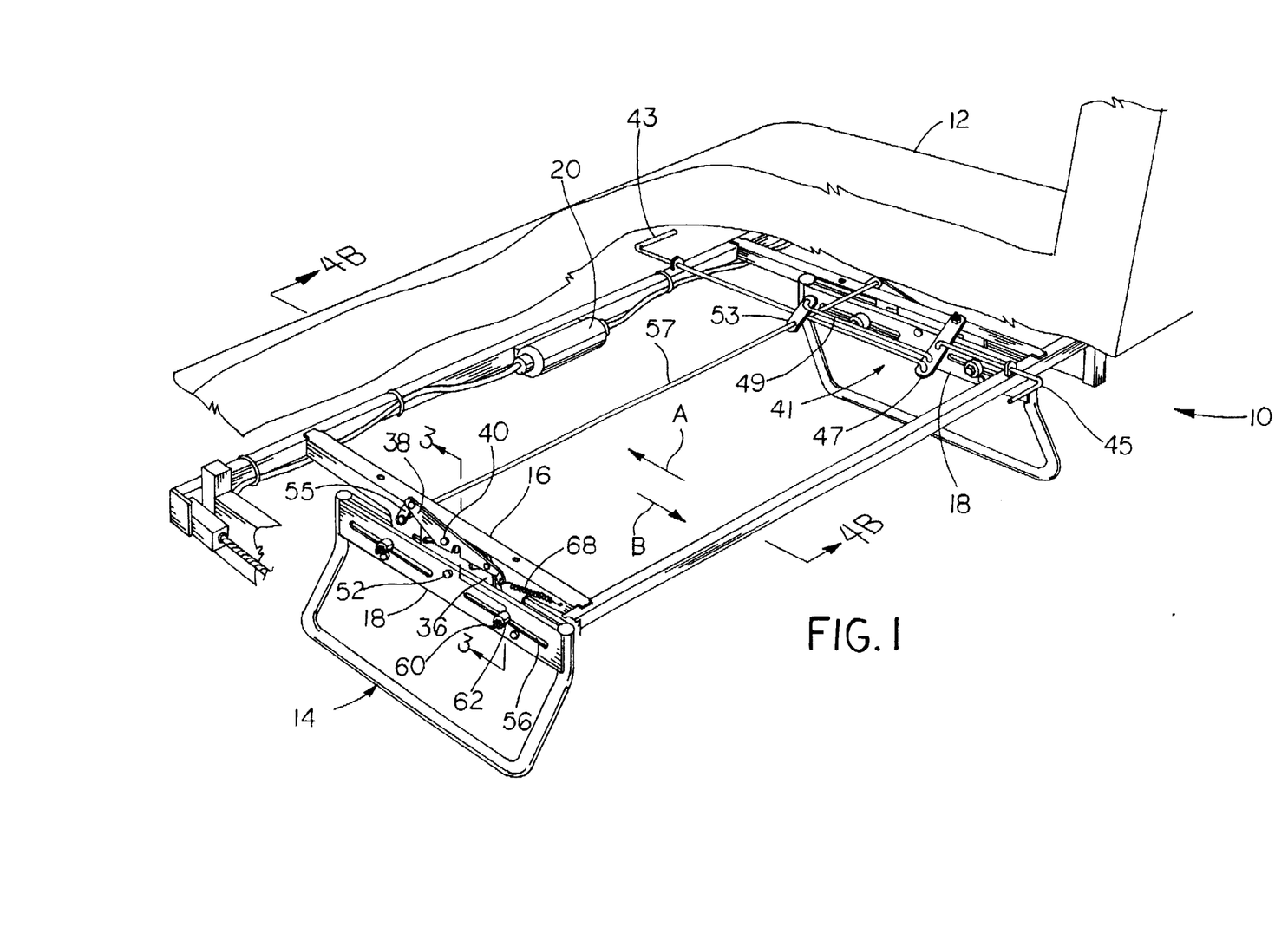
FIG. 1 a fragmentary perspective view of an adjustable seat assembly according to the present invention, in which portions of the seat support frame and the seat cushioning have been cut away for clarity.

Referring now to the drawings, FIG. 1 shows a locking adjustable seat assembly generally indicated by the reference numeral 10 for mounting a passenger seat 12 in the interior of a motor vehicle (not shown), that permits the seat 12 to slide in the forward direction, which is generally indicated by the arrow A, or in the rearward direction generally indicated by the arrow B. The seat assembly 10 includes a base frame 14 that is attached to the floor of the motor vehicle by bolts or other conventional means (not shown). The passenger seat 12 is mounted to a seat support frame 16, which is slidably mounted to base frame 14 by virtue of mounting bracket 18. Each end of bracket 18 is secured to base frame 14 by welding, bolting, or other conventional means. Seat assembly 10 may include as an option a motor drive 20 unit for powering a motorized reclining seat back and a motorized extensible foot rest (not shown).

Figure 2:
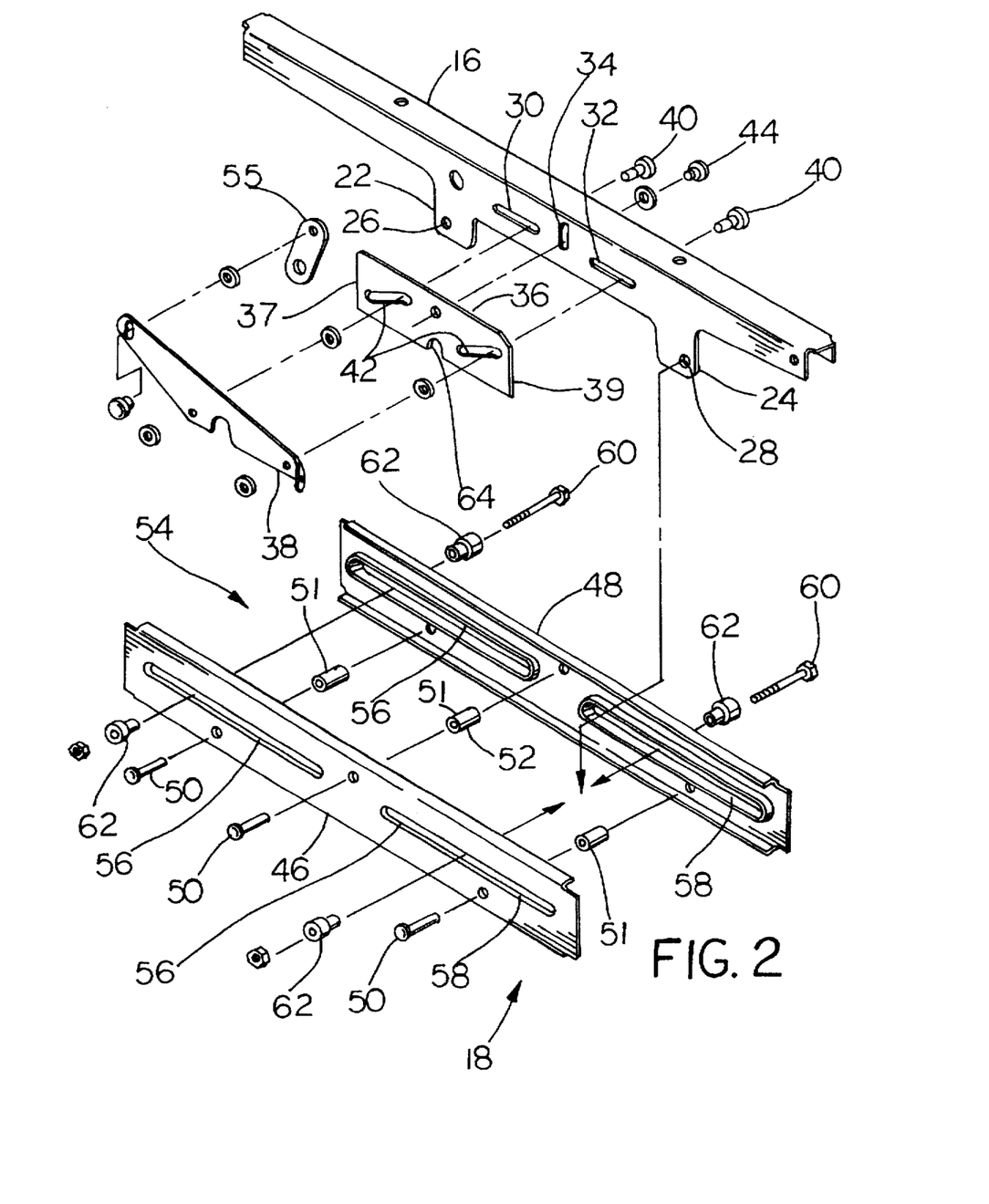
FIG. 2 is an exploded view in perspective of the seat support frame and the mounting bracket of the present invention.

Referring now to FIG. 2, seat support frame 16 includes a pair of downwardly extending portions 22, 24, each of which includes a mounting hole 26, 28, respectively. Seat support frame 16 also includes a pair of horizontal guide apertures 30, 32 and a vertical guide slot 34. Latch mechanism 36 includes a pair of inclined or diagonal slots 42, and latch mechanism 36 is slidably connected to seat support frame 16 by guide pin 44 so that latch mechanism 36 is free to move vertically as guided by vertical guide slot 34. Latch mechanism 36 also includes a forward portion 37 and a rearward portion 39. Actuating mechanism 38 is slidably

4 connected to seat support frame 16 by bolts 40 or other conventional means so that latch mechanism 36 is disposed between actuating mechanism 38 and seat support frame 16. Bolts 40 are sized so that they are free to slide fore and aft relative to the seat support frame, within the guide slots 30, 32 thus allowing latch mechanism 38 to slide fore and aft guided by guide slots 30, 32. Bolts 40 engage diagonal slots 42 so that any fore and aft movement of actuating mechanism 38 produces a corresponding vertical movement of latch mechanism 36. Also shown in FIG. 2, mounting bracket 18 includes a pair of elongated sidewalls 46, 48 that are fastened together by a plurality of rivets or bolts 50, or other conventional means. Each bolt 50 includes a spacer 51, which is placed between sidewalls 46 and 48 in order to maintain the proper distance between the sidewalls, so that a gap 54 is defined therebetween. The center bolt also serves as a locking pin 52. Each sidewall includes one or more elongated slots 56, and each slot 56 includes an in-turned flange 58 that provides a horizontal support surface for mounting bolts 60 as explained below.

Figure 3:
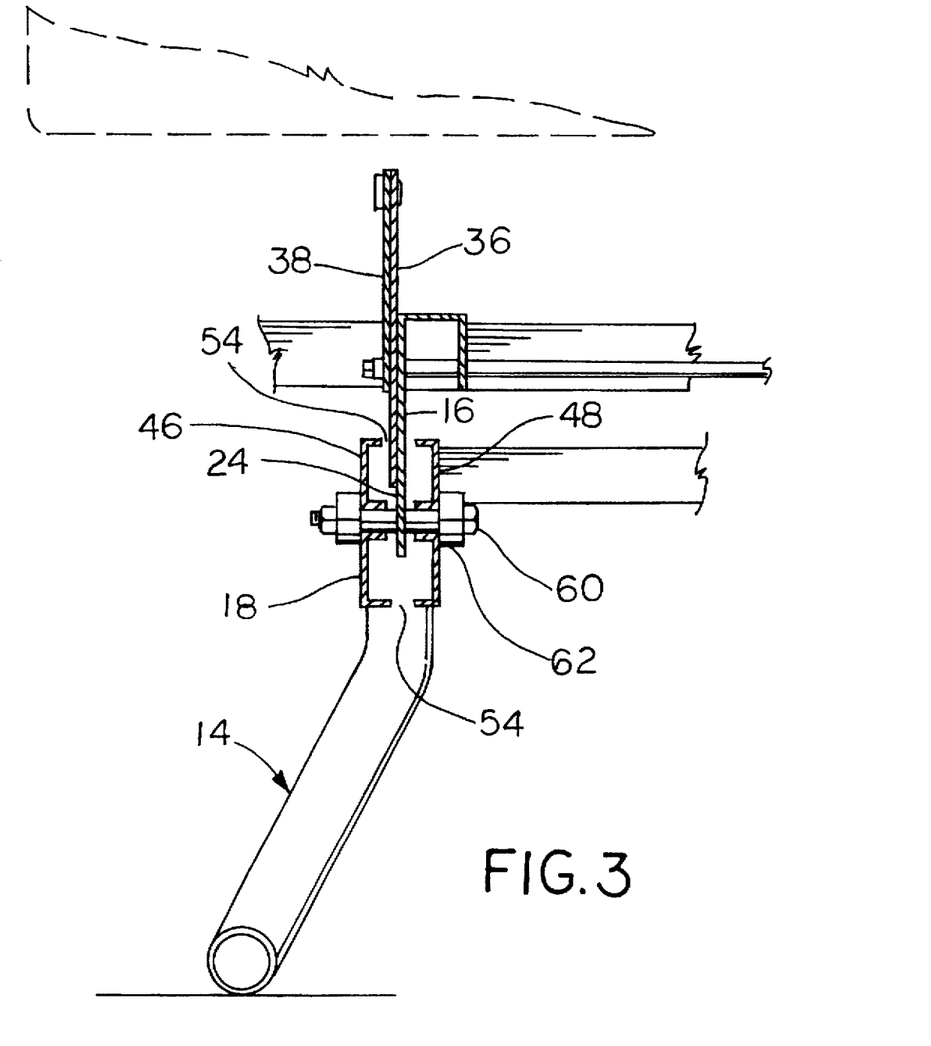
FIG. 3 is a fragmentary elevational view, partly in section, taken along line 3—3 of FIG. 1, showing the seat support frame protruding into the mounting bracket.

As is shown in FIG. 3, the downwardly extending portions 22, 24 of seat support frame 16 extend into the gap 54 between sidewalls 46, 48, and seat support frame 16 is connected to mounting bracket 18 by mounting bolts 60 through holes 26, 28. Mounting bolts 60 include bushings 62, which rest on flanges 58 of slots 56, enabling seat support frame 16 to slide smoothly in the fore and aft directions constrained by slots 56.

Figure 4:
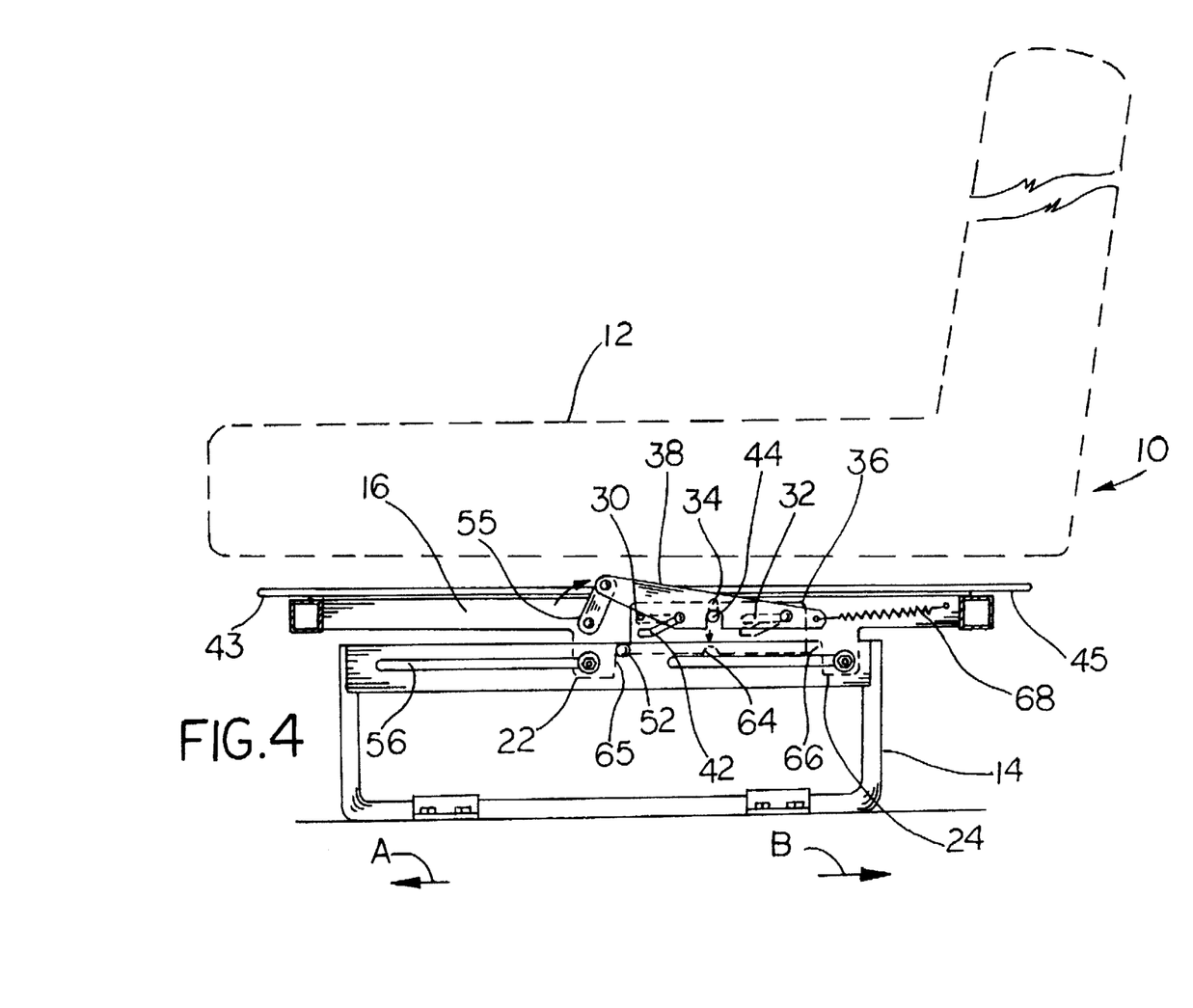
FIG. 4 is an elevational view taken along line 4—4 of FIG. 1, showing the seat locked in its rearmost position.
Figure 4A:
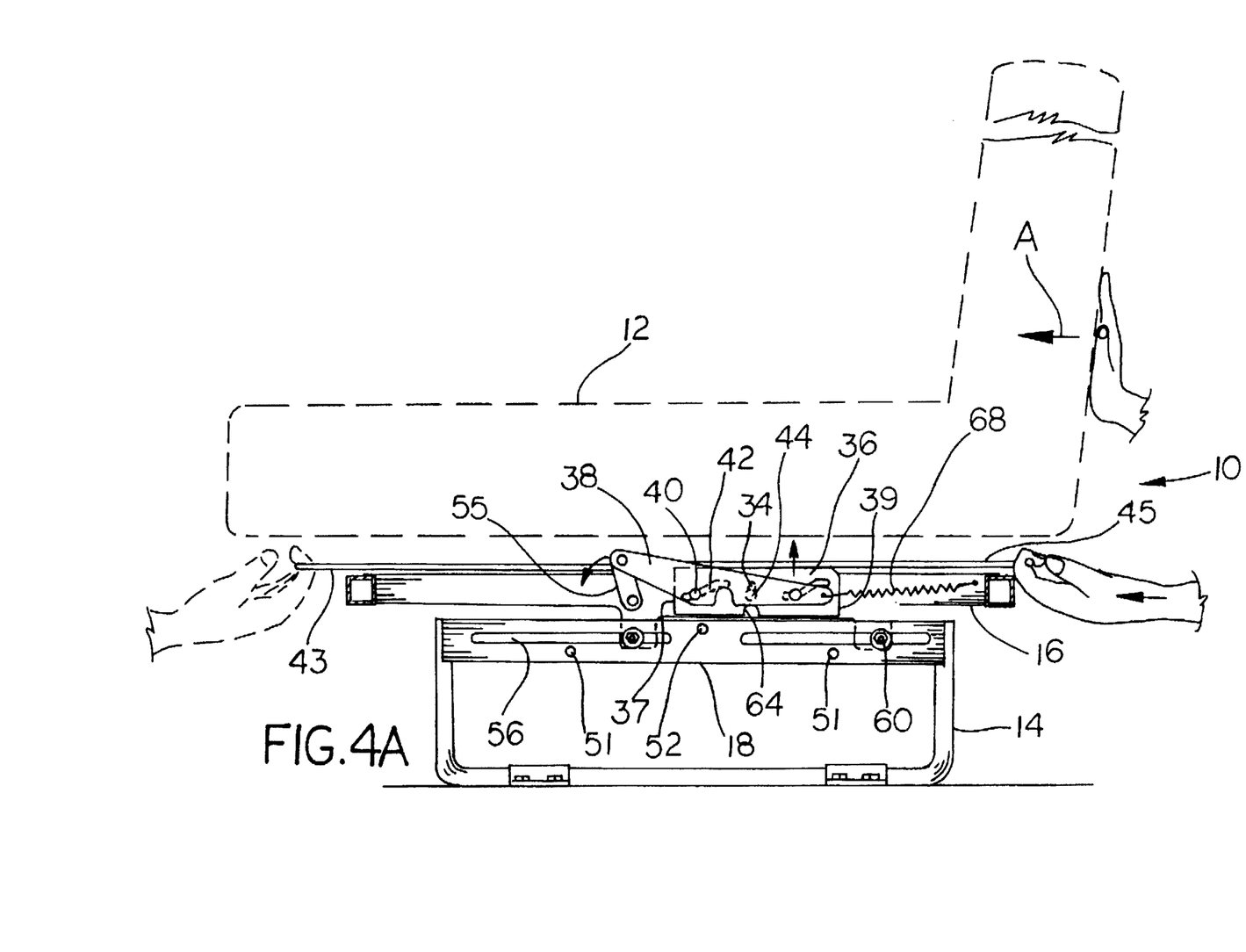
FIG. 4A is an elevational view similar to FIG. 4 and also taken along line 4—4 of FIG. 1, showing the latch mechanism in its adjust position with the seat being moved forward relative to the base frame.
Figure 4B:
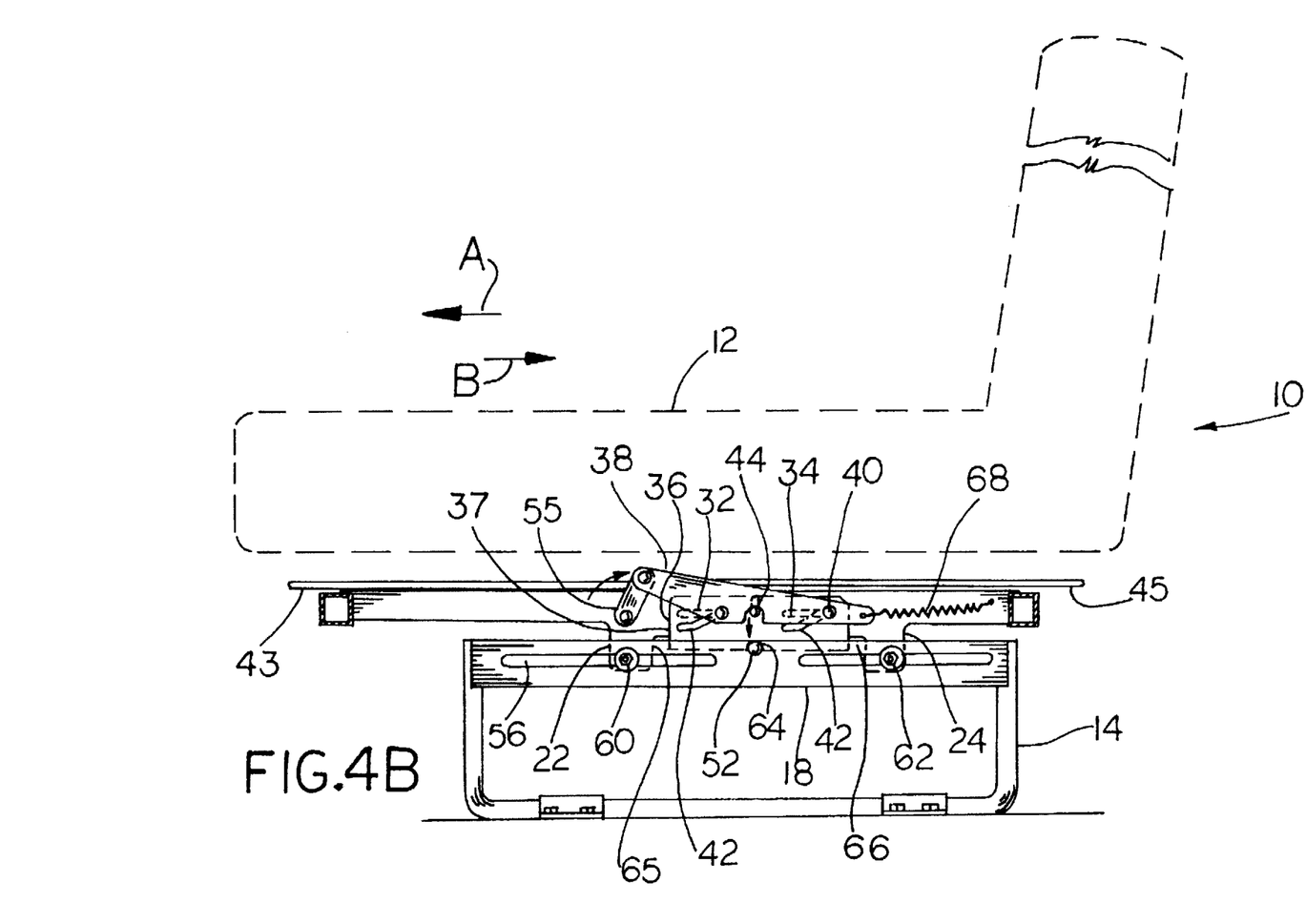
FIG. 4B in elevational view similar to FIGS. 4 and 4A and also taken along line 4—4 of FIG. 1, showing the latch mechanism in its lock position with the seat being located at an intermediate position.

As can be seen in FIG. 4, latch mechanism 36 also extends down into gap 54 between sideplates 46, 48 and a lock notch 64 in latch mechanism 36 engages a stationary locking pin 52 when latch mechanism 36 is in the downward or locked position. A forward lock notch 65 is defined between downwardly extending portion 22 of seat support frame 16 and the forward portion 37 of latch mechanism 36, and in a similar fashion a rearward lock notch 66 is defined between downwardly extending portion 24 of seat support frame 16 and the rearward portion 39 of latch mechanism 36 as shown in FIG. 4B. Fore and aft lock notches 65 and 66 engage locking pin 52 when the seat is in the rearmost and forward-most positions, respectively.

Figure 4C:
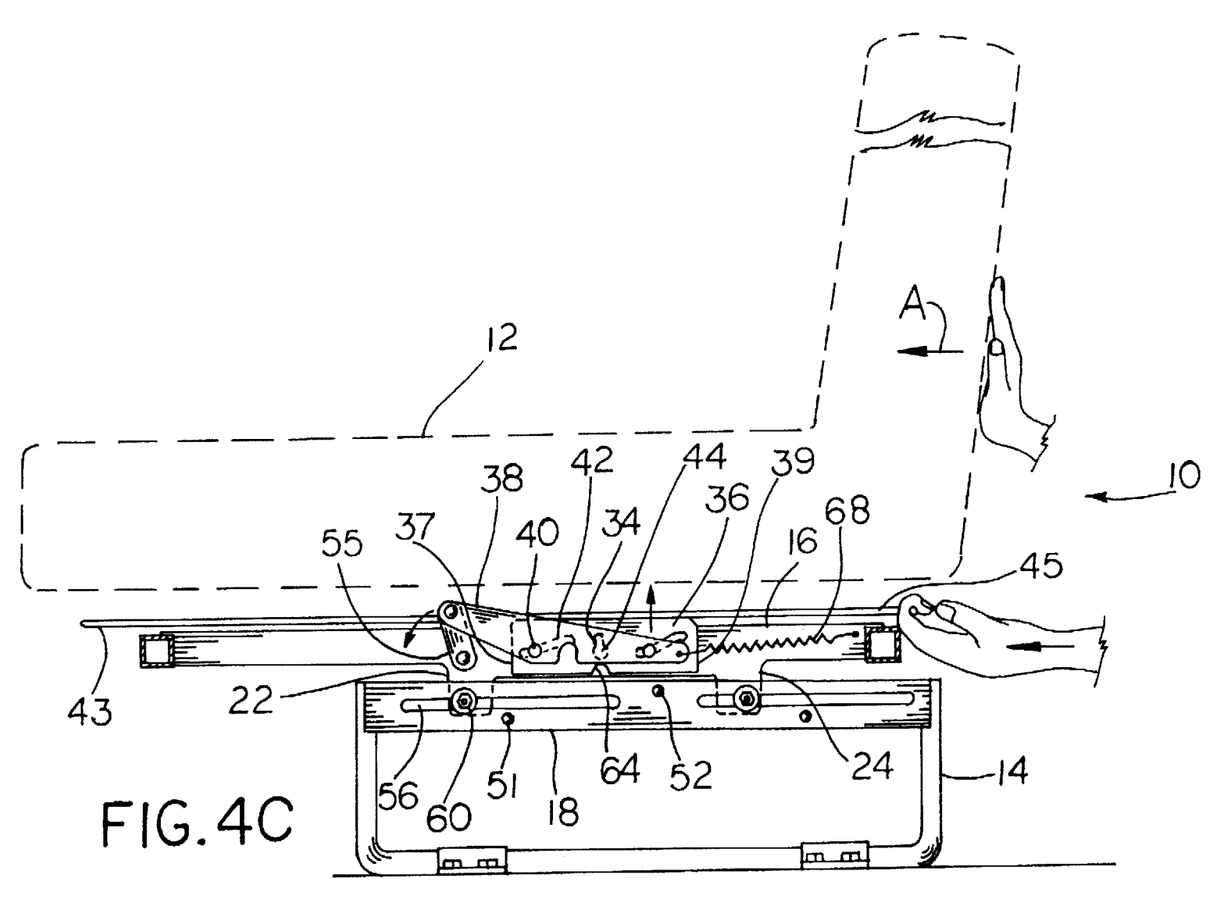
FIG. 4C is an elevational view similar to FIGS. 4, 4A, and 4B and also taken along line 4—4 of FIG. 1, showing the latch mechanism in its adjust position with theft being moved forward relative to the base frame.

In FIG. 4 the seat assembly 10 is shown with the seat 12 and seat support frame 16 positioned in the rear-most or aft position. Spring 68 urges actuation mechanism 38 in the aft direction relative to latch member 36, which urges latch mechanism 36 downward to the locked position so that lock notch 65 engages the locking pin 52. A linkage assembly 41 is connected to actuating member 38 and extends in both the forward and rearward direction, so that the latch member can be disengaged from either the front or the rear. As shown in FIG. 4A, the seat 12 and seat support frame are located in the aft or rear-most position, and lock notch 65 engages locking pin 52 so that the seat is locked in position. As shown in FIG. 4B, the seat 12 and seat support frame 16 have been moved forward relative to base frame 14 so that seat support frame 16 is located in an intermediate position. Latch mechanism 36 is shown in the downward or locked position so that notch 64 engages locking pin 52, thereby preventing movement of seat support frame 16 in the fore or aft position relative to base frame 12. As shown in FIG. 4C, seat support frame 16 and seat 14 have been moved to the forward-most position relative to base frame 12 and locking pin 52 is received in lock notch 66.

As shown in FIGS. 1 and 4, linkage assembly 41 includes a pair of handles 43, 45, and a horizontal swing arm 47 mounted to seat support frame 16. A first vertical swing arm 53 is connected to horizontal swing arm 47 by rod 49, and first swing arm 53 is connected to a second vertical swing arm 55 by rod 57. Second swing arm 55 is pivotably mounted to seat support frame 16 and actuating member 38. The fore and aft motion of handles 43 or 45 causes a fore and aft motion of swing arm 47 and rod 49, which in turn causes swing arm 53 to swing, thereby rotating rod 57. Rotation of rod 57 in turn causes swing arm 55 to swing, thereby producing a fore and aft movement in actuating member 38 so that latch member 36 can be manipulated.

Figure 4D:
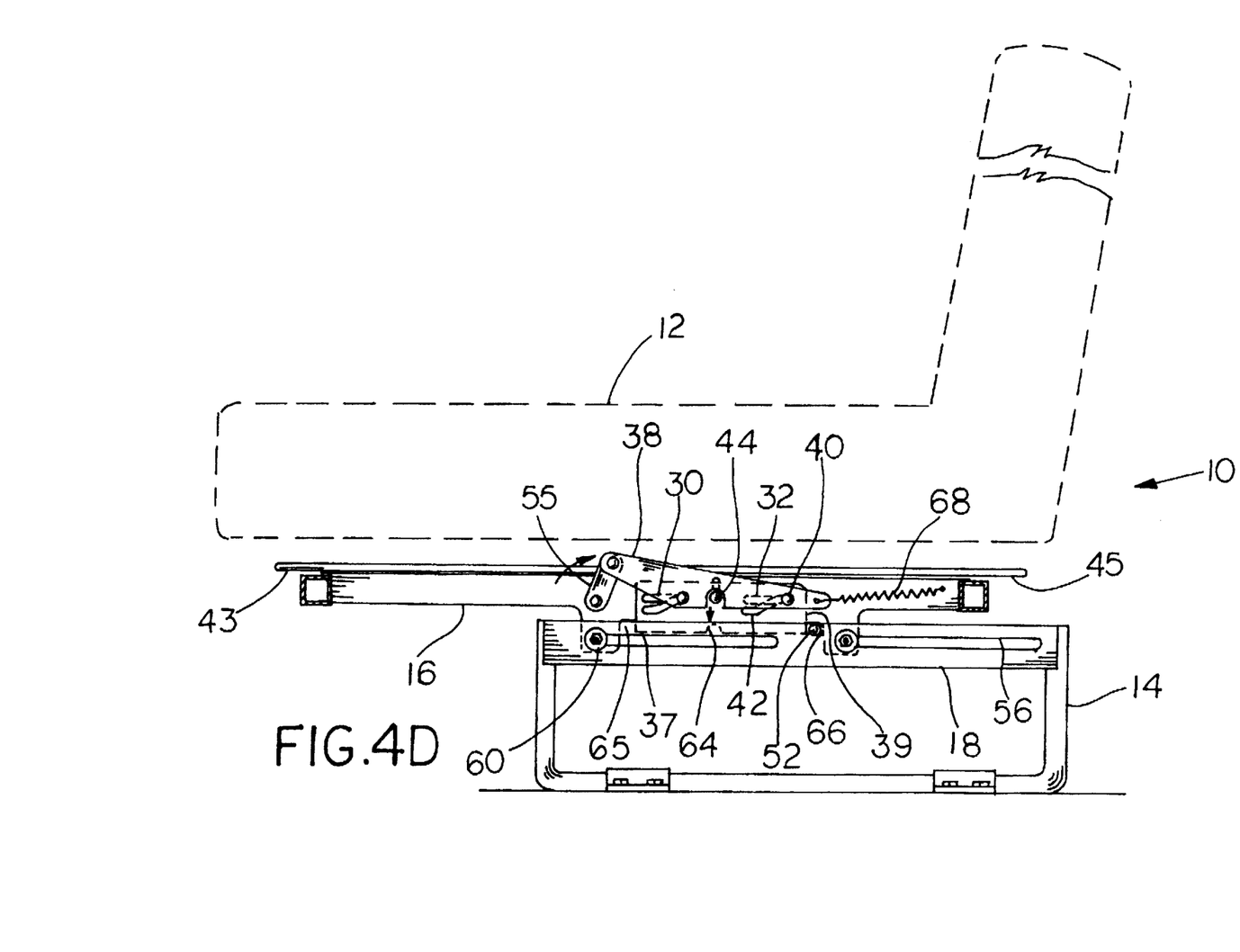
FIG. 4D is an elevational view similar to FIGS. 4 through 4C also taken along line 4—4 of FIG. 1, showing the latch mechanism in its lock position with the seat being located at its forward-most position relative to the base frame.

In operation as shown in FIG. 4A, the operator actuates the linkage 41 by pulling on handle 43 or pushing on handle 45. The movement of swing arm 55 caused by the rotation of rod 57 moves the actuating member 38 forward relative to locking member 36 causing bolts 40 to slide forward within guide slots 30, 32. As the actuating member 38 and bolts 40 move forward, the bolts 40 engage the diagonal slots 42 of latch mechanism 36 which urges latch mechanism 36 upward into its unlocked or adjust position. With latch mechanism 36 in the adjust position seat support member 16 is free to move in the fore or aft direction relative to mounting bracket 18 and base frame 12. When the seat support frame 16 and seat 12 are shifted to the positions shown in FIGS. 4, 4B or 4D, the restoring force of spring 68 urges actuating member 38 rearward which again causes bolts 40 to urge latch member 36 vertically downward by acting on the diagonal slots 42 of latch member 36, so that latch member 36 is returned to the lock position. With latch mechanism 36 in the locked position, lock notches 64, 65, or 66 engage locking pin 52 when the seat is located in the intermediate, rear-most, or forward-most positions, respectively.

Figure 5:
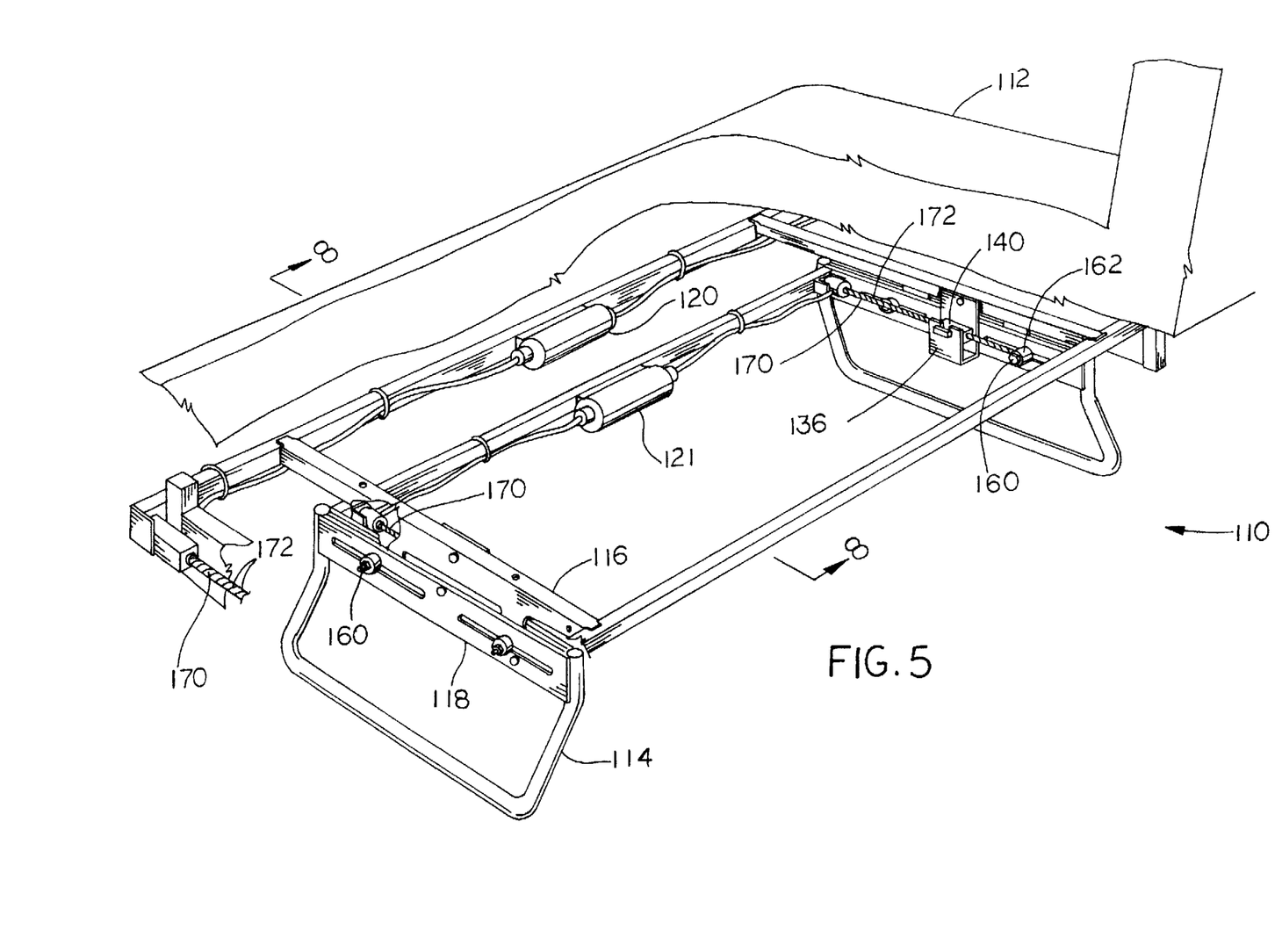
FIG. 5 is a perspective view similar to FIG. 1, but showing a second embodiment of the present invention.

FIGS. 5 through 8 illustrate a second embodiment of the claimed invention, in which elements that are the same or substantially the same as those in the embodiment of FIGS. 1–4D retain the same reference characters, but increased by 100. FIG. 5 shows a locking adjustable seat assembly generally indicated by the reference numeral 110 for mounting a passenger seat 112. The seat assembly 110 includes a base frame 114 that is attached to the floor of the motor vehicle by bolts or other conventional means (not shown). The passenger seat 112 is mounted to a seat support frame 116, which is slidably mounted to base frame 114 by virtue of mounting bracket 118. Seat assembly 110 includes a first motor drive 120 unit for powering a motorized reclining seat back and a motorized extensible foot rest (not shown), and a second motor drive positioning unit 121 for controlling the fore and aft position of the seat 112 relative to the base frame 114.

Figure 6:
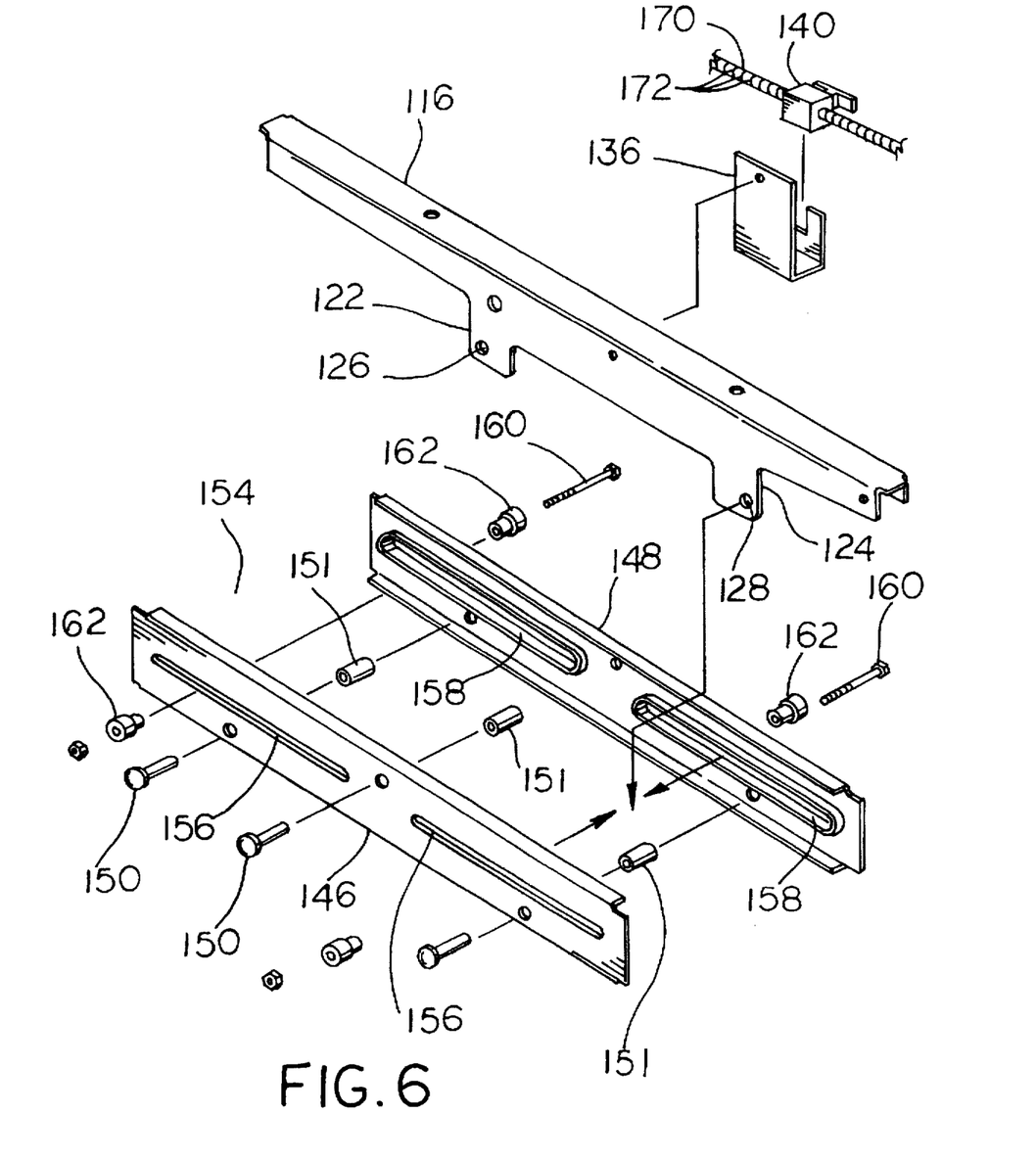
FIG. 6 is an exploded view in perspective of the seat support frame and the mounting bracket of the second embodiment of the present invention illustrated in FIG. 5.

Referring now to FIG. 6, seat support frame 116 includes a pair of downwardly extending portions 122, 124, each of which includes a mounting hole 126, 128, respectively. Seat support frame 116 bracket also includes a mounting hole 134 for attaching hanger 136. Also shown in FIG. 6, mounting bracket 118 includes a pair of elongated sidewalls 146, 148 that are fastened together by a plurality of rivets or bolts 150, or other conventional means. Each bolt 150 includes a spacer 151, which is placed between sidewalls 146 and 148 so that a gap 154 is defined therebetween. Each sidewall 146, 148 includes one or more elongated slots 156, and each slot 156 includes an in-turned flange 158 that provides a horizontal support surface for mounting bolts 160. Mounting bolts 160 include bushings 162 which rest on flanges 158 to enable seat support frame 114 to slide smoothly in the forward and rearward directions relative to base frame 114.

Figure 7:
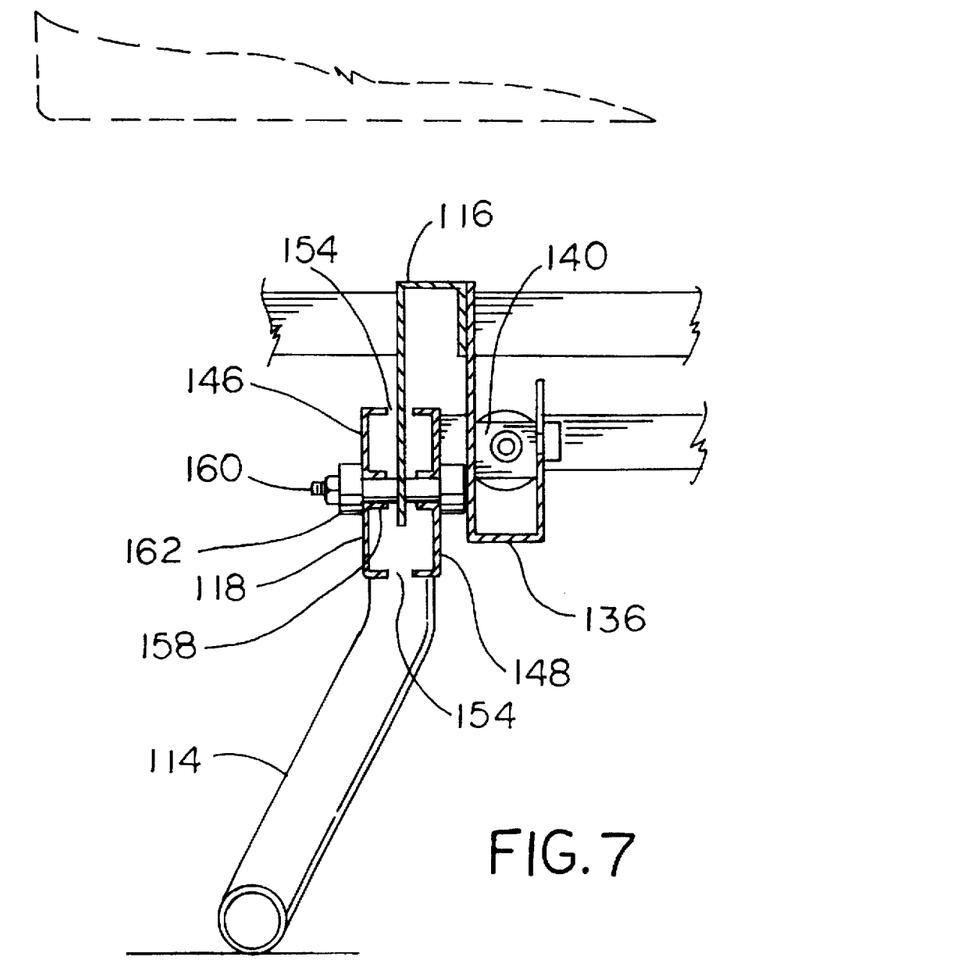
FIG. 7 is a fragmentary elevational view, partly in section, taken along line 7—7 of FIG. 5, showing the seat support frame protruding into the mounting bracket and the worm gear of the second embodiment.
Figure 8:
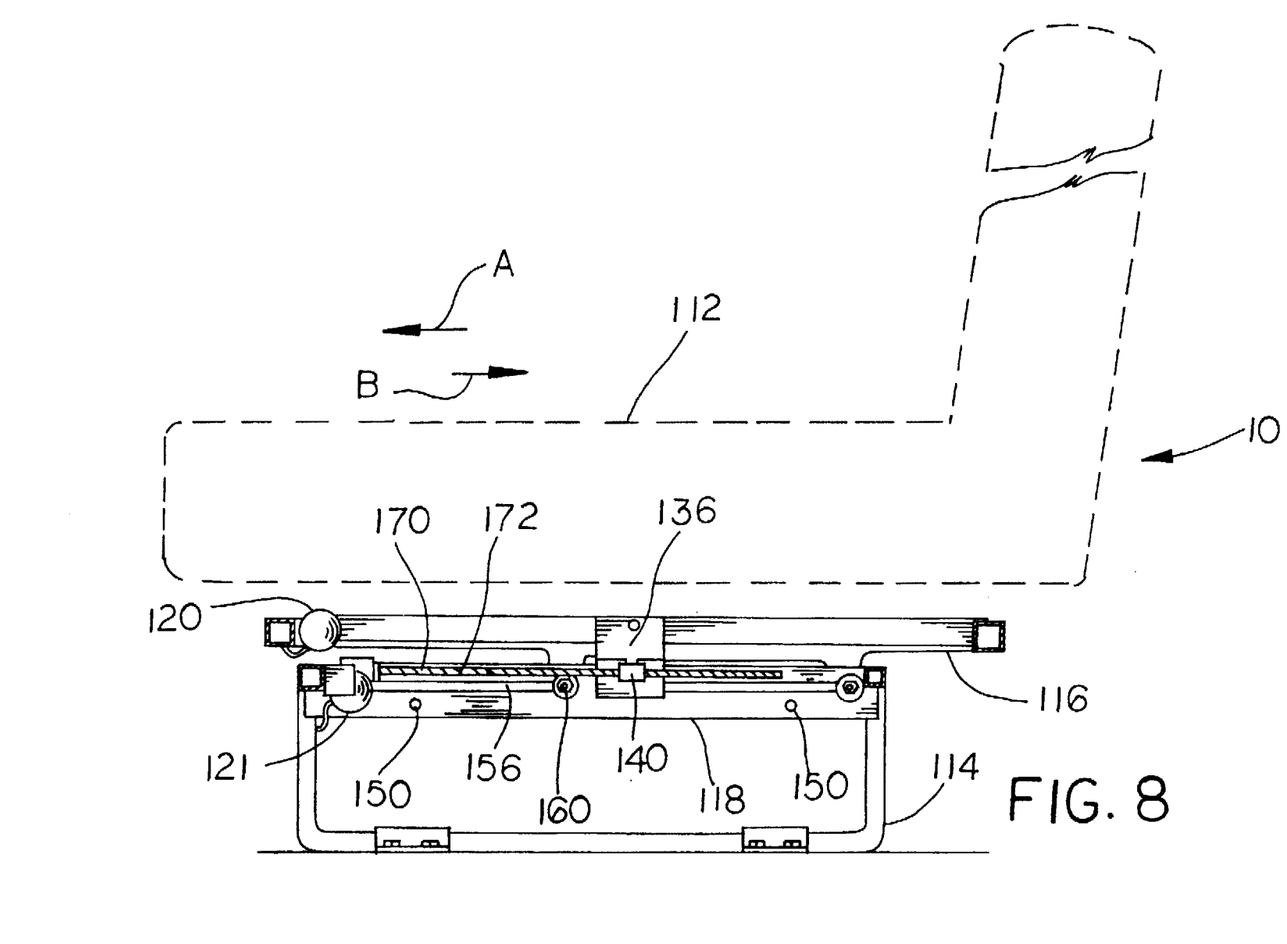
FIG. 8 is an elevational view taken along line 8—8 of FIG. 5, showing the worm drive of the second embodiment with the seat in an intermediate position.

As is shown in FIGS. 7 and 8, the downwardly extending portions 122, 124 of seat support frame 116 extend into the gap 154 between sidewalls 146, 148, and seat support frame 116 is connected to mounting bracket 118 by mounting bolts 160 through holes 126, 128. Hanger 136 supports a gear follower 140, which engages a threaded worm gear 170 which is connected to motor drive positioning unit 121 so that upon activation of positioning unit 121 threaded worm gear 170 rotates about its longitudinal axis. Threaded worm gear 170 includes external threads 172, and gear follower 140 engages threads 172 so that the rotation of worm gear 170 causes follower 140, hanger 136, and the attached seat support frame 116 to move in the fore or aft directions depending on the direction of rotation of worm gear 170. By controlling the angle of the threads on worm gear 170, and by controlling the number of threads per inch, the position of the seat 112 and seat support frame 116 is effectively locked relative to base frame 114 when the motor drive unit is not being operated. The number of threads per inch allows gear follower 140 to firmly engage worm gear 170 so that the follower is not free to slide axially along worm gear 170 in the event of an impact. On the other hand, the angle of the threads makes it practically impossible for gear follower 140 to induce free rotation of worm gear 170 when a fore or aft force is applied to the seat. Accordingly, in the event of an impact the position of gear follower 140 relative to worm gear 170, like the position of the seat support frame relative to the base frame, remains fixed.

Figure 1A:
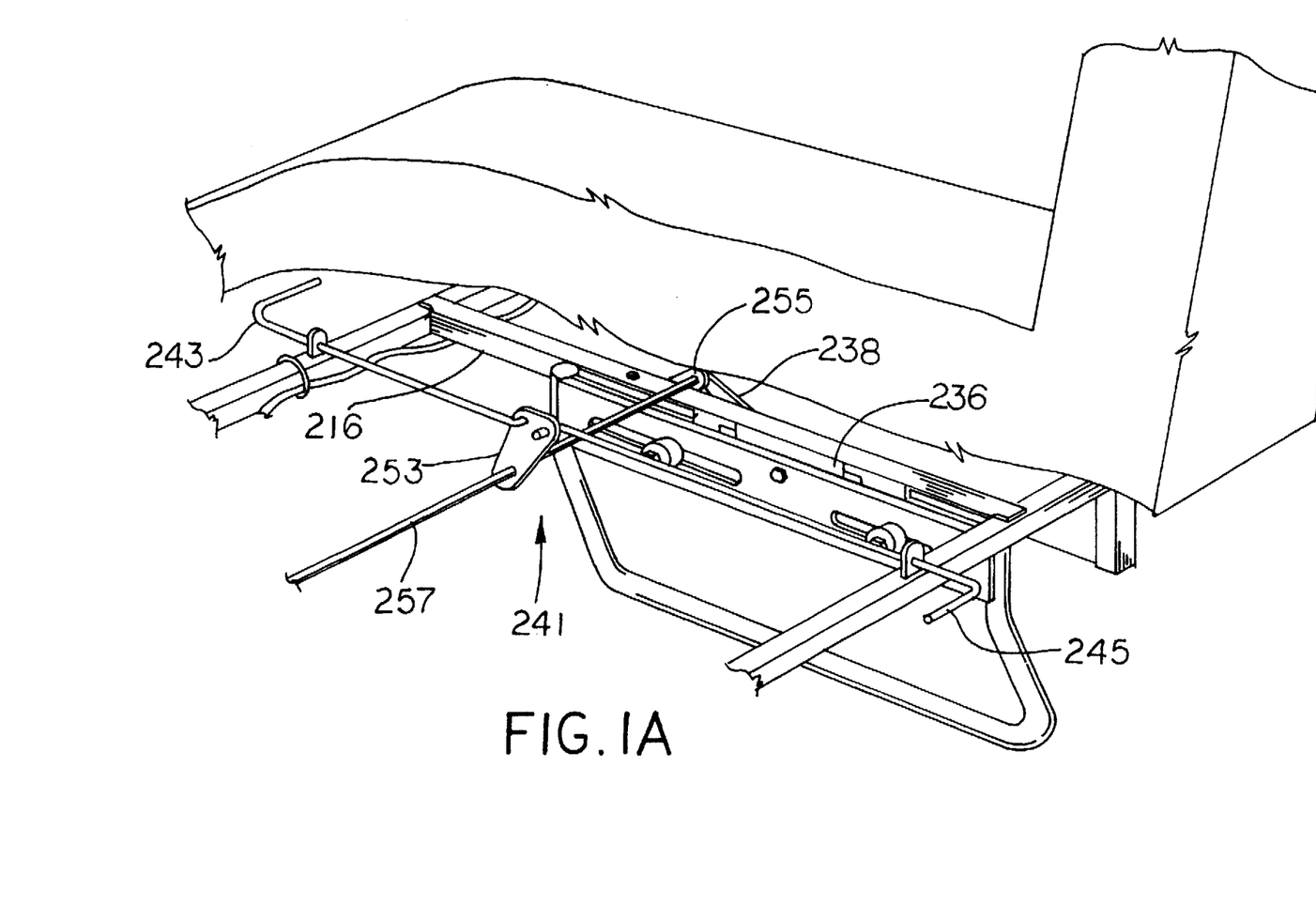
FIG. 1A is enlarged fragmentary perspective view of the adjustable seat assembly shown in FIG. 1, but utilizing a simplified version of the linkage assembly.

FIG. 1A illustrates a third embodiment of the claimed invention, in which elements that are the same or substantially the same as those in the embodiment of FIGS. 1–4D retain the same reference characters, but increased by 200. In the third embodiment, the linkage assembly 241 includes a pair of handles 243, 245 which are connected to a first vertical swing arm 253. Swing arm 253 is connected to a second vertical swing arm 255 by rod 257. Second swing arm 255 is pivotably mounted to seat support frame 216 and actuating member 238. The fore and aft motion of handles 243 or 245 causes a fore and aft motion of swing arm 253 which rotates rod 257, which in turn causes swing arm 255 to swing, thereby producing a fore and aft movement in actuating member 238 so that the latch member 236 can be manipulated.

It is understood that the above description does not limit the invention to the above-given details, but may be modified within the scope of the following claims.

I claim:

1. A locking adjustable seat assembly for mounting a passenger seat in a motor vehicle, comprising:

a base frame for attachment to the floor of the motor vehicle;

a seat support frame slidably mounted on said base frame for carrying a passenger seat thereon; and mounting means for mounting said seat support frame to said base frame and further for allowing said seat support frame to move fore and aft relative to said base frame, said mounting means including locking means for locking the position of said seat support frame relative to said base frame, said locking means including a locking pin rigidly mounted on one of said frames and immovable with respect thereto, and a latching mechanism mounted on the other of said frames, said latching mechanism being moveable from an adjust position wherein said seat support frame is moveable relative to said base frame to a lock position wherein said latching mechanism engages said locking pin to fix the position of said seat support frame relative to said base frame.

2. A locking adjustable seat assembly as claimed in claim 1, wherein said locking means includes positioning means for positioning said seat support frame in a variety of positions relative to said base frame.

3. A locking adjustable seat assembly as claimed in claim 2, wherein said positioning means includes one or more notches in said latching mechanism.

4. A locking adjustable seat assembly as claimed in claim 2, wherein said positioning means includes one or more notches in said latching mechanism, and further includes one or more notches defined between said latching mechanism and said seat support frame when said latching mechanism is in said lock position.

5. A locking adjustable seat assembly as claimed in claim 1, wherein said mounting means includes a bracket mounted to said base frame, said bracket including a pair of substantially parallel spaced apart side walls, said side walls defining a gap therebetween, wherein a protruding portion of said seat support frame and said locking means extends into said gap.

6. A locking adjustable seat assembly as claimed in claim 5, wherein each of said side walls includes one or more elongated slots, wherein said protruding portion of said seat support frame is slidably supported by said slots to permit said seat support frame to slide fore and aft constrained by said slots when said locking means is in said adjust position.

7. A locking adjustable seat assembly as claimed in claim 6, wherein said slots are defined in part by one or more in-turned flanges extending from one or more of said side walls.

8. A locking adjustable seat assembly as claimed in claim 1, wherein said locking means includes an actuating mechanism for actuating said locking means, wherein movement of said actuating mechanism produces a corresponding movement of said latching mechanism, said actuating means being movable between an engage position wherein said locking means is moved to said adjust position, and a release position wherein said locking means is moved to said lock position.

9. A locking adjustable seat assembly as claimed in claim 8, wherein said corresponding movement of said latching mechanism is in a substantially vertical direction.

10. A locking adjustable seat assembly as claimed in claim 9, wherein said actuating mechanism moves in a substantially horizontal direction.

11. A locking adjustable seat assembly as claimed in claim 8, wherein said latch mechanism includes one or more angled tracks and said actuating mechanism includes one or more pins for engaging said angled tracks, so that upon movement of said actuating mechanism said pins engage said tracks thereby moving said latch mechanism between said adjust position and said lock position.

12. A locking adjustable seat assembly as claimed in claim 8, including a spring attached to said actuating mechanism for urging said actuating mechanism towards said release position.

13. A locking adjustable seat assembly for mounting a passenger seat in a motor vehicle, comprising:

a base frame for attachment to the floor of the motor vehicle;

a seat support frame slidably mounted on said base frame for carrying a passenger seat thereon; and mounting means for mounting said seat support frame to said base frame and further for allowing said seat support frame to move fore and aft relative to said base frame, said mounting means including locking means for locking the position of said seat support frame relative to said base frame, said locking means including a locking pin mounted on one of said frames, said locking pin being stationary relative to said one frame, and a latching mechanism mounted on the other of said frames, said latching mechanism being moveable from an adjust position wherein said seat support frame is moveable relative to said base frame to a lock position wherein said latching mechanism engages said locking pin to fix the position of said seat support frame relative to said base frame, said mounting means including a bracket mounted to said base frame, said bracket including a pair of substantially parallel spaced apart side walls, said side walls defining a gap therebetween, wherein a protruding portion of said seat support frame and said locking means extends into said gap, each of said side walls including at least two elongated slots, said slots being substantially co-linear with each other, wherein said protruding portion of said seat support frame is slidably supported by said slots to permit said seat support frame to slide fore and aft constrained by said slots when said locking means is in said adjust position.

* * * * *